Aug. 13, 1968  E. J. SIMANEK ET AL  3,396,823
VARIABLE LOAD BRAKE

Filed Oct. 12, 1966  3 Sheets-Sheet 1

Inventors:
Edward J. Simanek
Mario Martini
By Walter L. Schlegel Jr.
Ralph M. Watt Atty

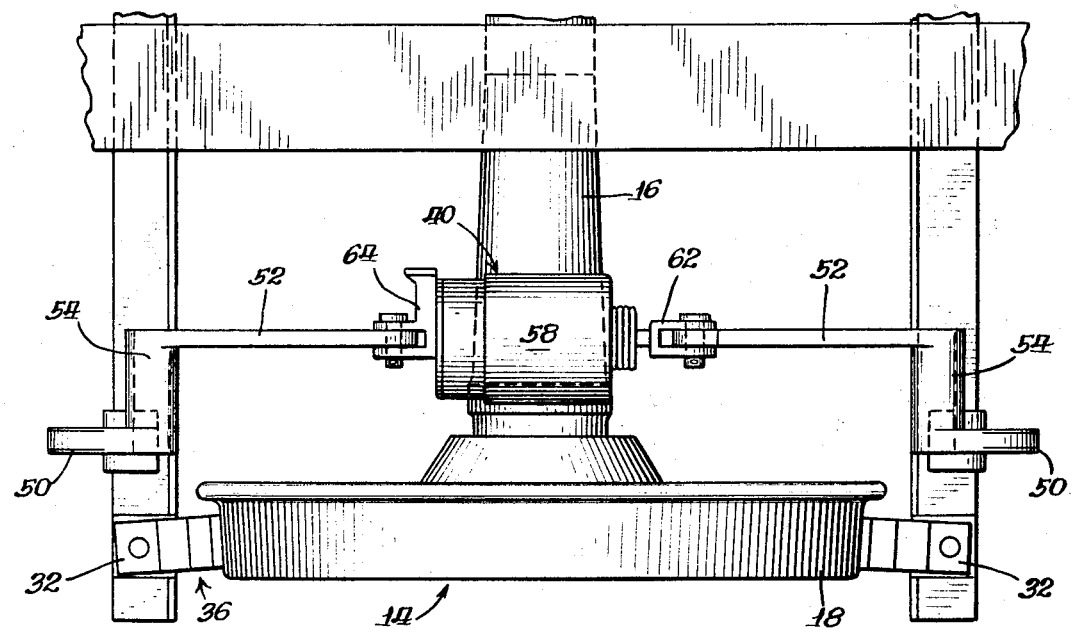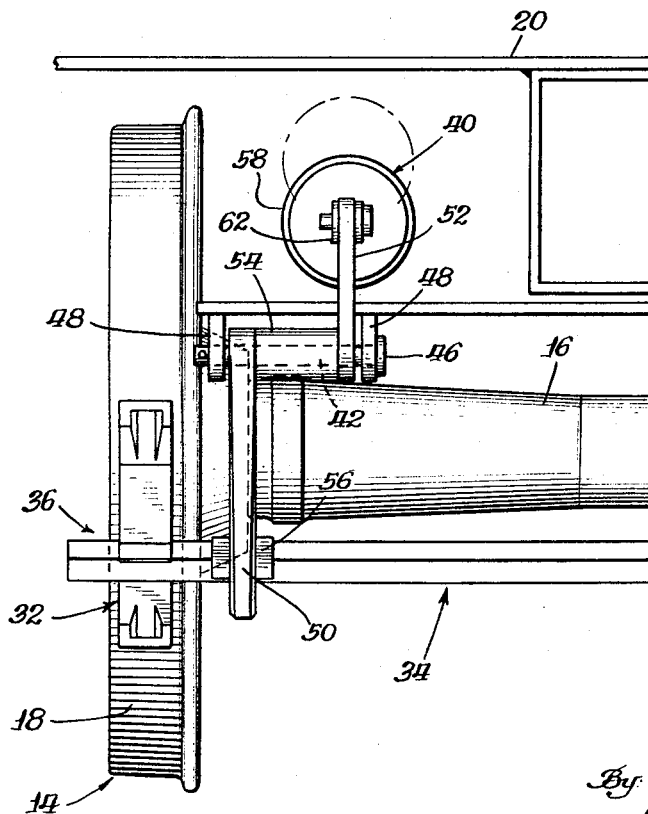

Aug. 13, 1968   E. J. SIMANEK ET AL   3,396,823
VARIABLE LOAD BRAKE
Filed Oct. 12, 1966   3 Sheets-Sheet 3

Inventors:
Edward J. Simanek
Mario Martini
By Walter S. Schlegel, Jr.
Atty.

United States Patent Office 3,396,823
Patented Aug. 13, 1968

3,396,823
VARIABLE LOAD BRAKE
Edward J. Simanek, Homewood, Ill., and Mario Martini, Munster, Ind., assignors to Amsted Industries Incorporated, Chicago, Ill., a corporation of New Jersey
Filed Oct. 12, 1966, Ser. No. 586,100
7 Claims. (Cl. 188—56)

ABSTRACT OF THE DISCLOSURE

In a variable load tread brake rigging for railway cars having a body resiliently supported on wheel and axle assemblies, two power levers are pivotally suspended intermediate their ends from a car body on opposite sides of a wheel. Brake shoes on opposite sides of the wheel are mounted for movement toward and away from the wheel to frictionally engage the tread surface. A surface on one end of each lever is in sliding engagement with its respective shoe. The other end of each lever is pivotally connected to an air cylinder for pivotal movement of the lever to frictionally engage the brake shoes against the wheel's tread surfaces.

---

The present invention relates to a variable load brake for railway cars.

The invention is directed to that kind of brake arrangement in which the effective braking force is increased in proportion to an increased load for any given applied force.

The invention is utilized in an arrangement wherein the car body is yieldably mounted for limited vertical yielding movement relative to the wheels, the car body being disposed lower under a heavy load than under a light load. This difference in position of the car body relative to the wheels is utilized in applying greater mechanical force by the power means on the brake shoes in applying the latter to the wheels. A broad object of the present invention is to provide a new apparatus of the foregoing general type.

Another object is to provide a brake mechanism of the foregoing general character which is supported entirely from the car body.

An additional object is to provide, in one form of the invention, a clasp brake arrangement in which the power means is interconnected between two power levers associated with opposed brake shoes and supported entirely by those power levers, and in another form, a single brake arrangement in which the power means is supported at one end on a power lever and at the other end on the car body.

A further object is to provide brake mechanism of the foregoing general character that is unusually simple in construction.

Other objects and advantages of the invention will appear from the following detail description taken in conjunction with the accompanying drawings in which:

FIGURE 4 is a top view of the arrangement shown in FIGURE 3;

FIGURE 5 is a view from the right of FIGURE 3; and

Figure 1:
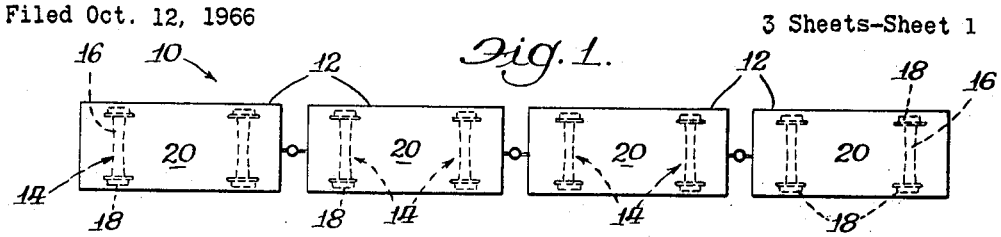
FIGURE 1 is a diagrammatic plan view of an articulated railway car.
Figure 2:
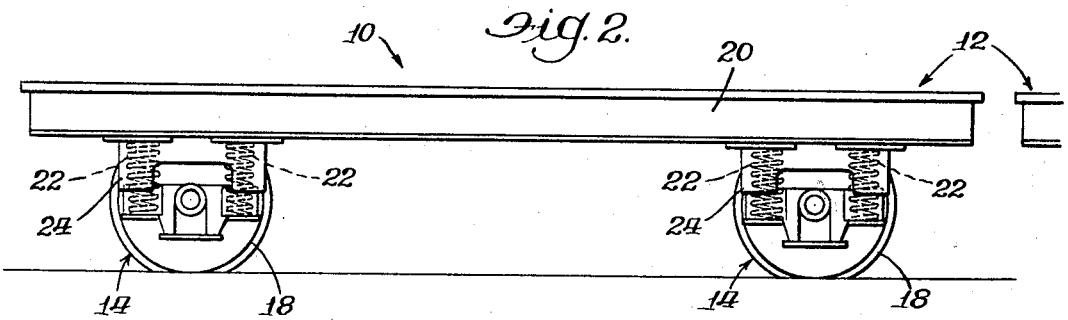
FIGURE 2 is a semidiagrammatic view showing a portion of a car and brake means of the present invention.

The accompanying disclosure shows the invention applied to a jointed or articulated car indicated in its entirety at 10 made up of a plurality of sections 12, such as four in number, having articulated interconnection. It is to be understood, however, that the invention is not limited to such type of car. Each section is mounted on two wheel-and-axle assemblies 14, one adjacent each end, and each including an axle 16 and a pair of wheels 18, the car not incorporating the usual tracks of multiple wheels.

Each car section 12 includes a body 20 resiliently supported by springs 22, seated on side frames 24 that are supported on wheel-and-axle assemblies 14. As a load is placed on the body 20, the resilient means yield thereby lowering the body proportional to the size of the load.

For the purpose of convenience in representing the relative positions of the body and the wheel-and-axle assemblies, the wheel-and-axle assemblies are indicated in elevated positions to correspond with lowered positions of the body. For example, in FIGURE 3, the line 26 represents the position of the wheel-and-axle assembly relative to the body of an empty car section, while the line 28 represents the relative position of the wheel-and-axle assemblies in a loaded car section, which may be any arbitrarily selected size of load, the representation of the body remaining in the same position in both instances in this figure of the drawing. Another line 30 represents the springs 22 in solid position. It will be understood that as a car section is loaded, the body actually lowers thereby reducing the distance between the body 20 and axles 16, as shown by the lines 26, 28, and 30.

Figure 3:
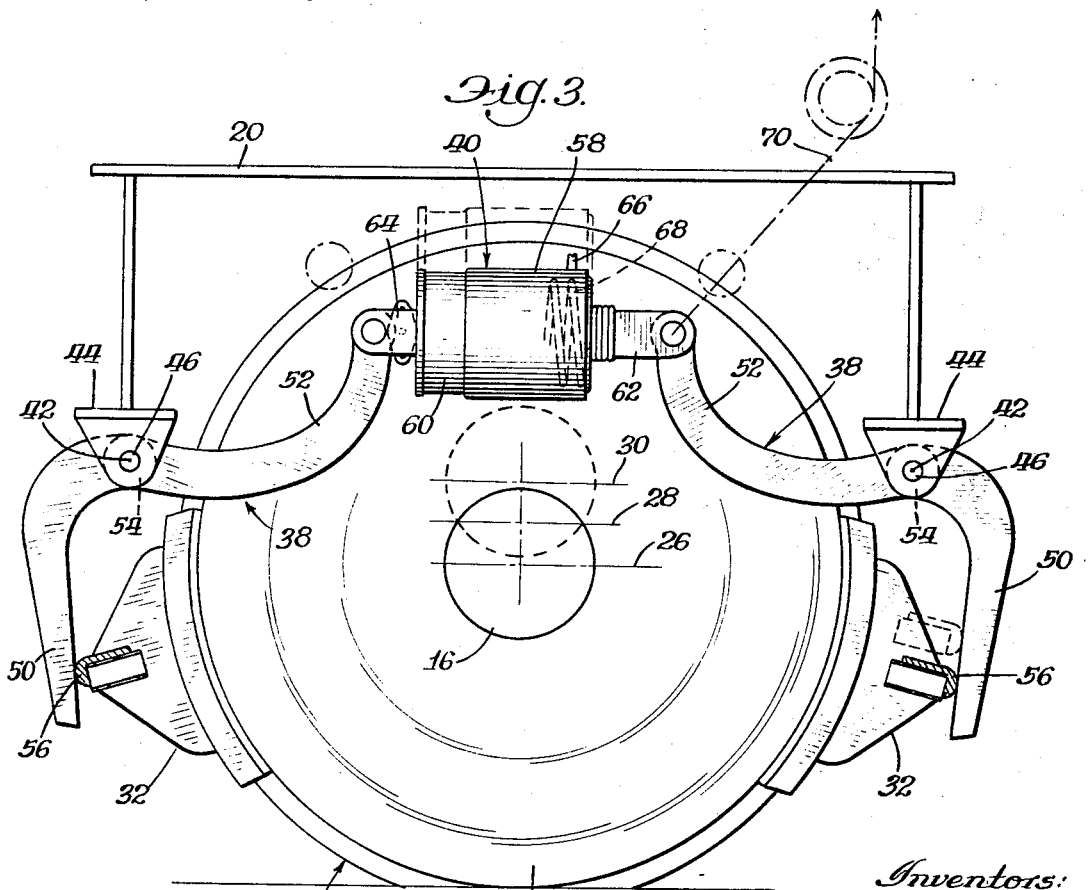
FIGURE 3 is a large scale axial view of a wheel and axial assembly incorporating a clasp brake arrangement.

One form of the invention is applied to a clasp brake arrangement as shown in FIGURES 3, 4 and 5. In such an arrangement a pair of brake shoes 32 are provided for each wheel. Two shoes are aligned transversely of a section and are mounted on a brake beam 34 of suitable and known type suspended from the side frames 24 so as to be fixed relative to the wheels, and thus independent of the vertical movement of the body. The brake beam suspension means 36 as is usual permits the brake beam, and thus the brake shoes, to swing toward and away from the wheel treat in a known manner, and if desired, means may be provided for normally biasing the brake shoes out of braking position.

The braking mechanism, as illustrated in FIGURE 3, comprises power levers 38 interconnected at one end by a power device or motor 40 for each wheel. Each power lever 38 is pivoted at 42 in a fixed bracket 44 mounted on the body and movable vertically therewith, so as to carry the levers in the vertical movements of the body under varying loads. The pivotal connection 42 is illustrated in FIGURE 5 as a bolt 46 supported by a pair of spaced lugs 48 of the bracket 44. Each power lever 38 is made up of a downwardly extending arm 50 and an arcuate arm 52 extending toward the vertical plane of the wheel axis. The arms 50 and 52 are illustrated as separate elements rigidly interconnected by a sleeve 54.

The lower arms 50 have detached and sliding engagement with hardened bosses 56 on the ends of the brake beams 34. The arms 50 may also be hardened. The power device 40 is illustrated as a pneumatic cylinder comprising an outer cylinder 58 in sliding engagement with an inner cylinder 60. The arms 52 are pivotally connected at one end to arms 62 or 64 that are respectively mounted on the ends of the cylinders 58 and 60. A pneumatic line 66 interconnects the usual supply of air (not shown) with the power device. The cylinders 58 and 60 may be forced relatively outwardly to an operational position by increasing the air pressure within the power device 40 and may be biased inwardly toward a contracted position by suitable means, such as a tension spring 68 and a reduction in the air pressure.

In the normal use of the car, and operation of the brake apparatus, an empty car condition is assumed which is that represented by the full lines in FIGURE 3.

In such position the effective point of engagement between the lower arm 50 and the brake shoe (i.e., the boss 56) is closely adjacent the lower end of the lever arm 50, or at a point remote from the pivotal point 42. Upon application of the brakes, i.e., expansion of the power device 40, the power generated is exerted through relatively long lever arms 50. In the case of a loaded car, the lever arm 50 is lowered relative to the brake shoe as represented by the dotted line position of the boss 56, in FIGURE 3, resulting in an effective shorter lever arm 50, i.e., the distance between the pivotal point 42 and the point of engagement of the lever arm 50 and the boss 56. In the latter case, upon energization of the power device 40, a substantial mechanical advantage is realized because of the shorter effective lever arm 50 with corresponding greater braking force by the brake shoes against the wheel.

The power device 40 is supported entirely by the power levers 38 and floats between the solid and dotted line positions according to the different braking positions of the power levers, rising for example upon swinging of the upper lever arms 52 outwardly.

As the power device 40 rises, it will be noted that the arms 62 and 64 continue to act in a substantially horizontal line. Further, the effective axis of the arms 52 (which may be conceived of as imaginary straight levers connecting the pivotal points 42 and the pivotal connection of the arms 62 and 64) attains a more nearly vertical position.

It is well known to those skilled in the art that angular movement of a lever may only be accomplished by application of a force component normal to the effective axis of the lever. Thus, as the cylinder 40 rises in our invention, the horizontal force applied to the levers 38 becomes progressively more nearly normal to the power levers 38, thus applying a greater proportion of the total piston rod force to the angular movement of the lever.

This second increase in mechanical advantage offsets, to a varying extent, the decrease in maximum force available from the piston rods 62 and 64 as the cylinder 40 rises.

Only a limited volume of compressed air is available for actuation of this braking system. When the brake system is actuated, the compressed air enters the power device 40, in known manner, filling the cavity therein. As the piston rods 62 and 64 are forced outward, the cavity expands, thus lowering the air pressure therein. Such decrease in pressure upon the cylinder results in less force applied to the power levers 38 by the piston rods 62 and 64.

The mechanism is also substantially self-adjusting in all vertical positions of the body, and in all positions of the brake shoes toward and from the wheels. The sliding movement between the lower lever arms 50 and the brake shoes readily accommodates the range of permissible movements of the brake shoes as well as of the elements 58 and 60. Additionally, the arrangement is self-adjusting from the standpoint of worn brake shoes since the extension of the power device 40 takes up the necessary throw of the lever arms 50 for applying the brake shoes.

The arrangement is also applicable to hand brake operation, such as by means of a cable or chain 70 connected with one of the power levers 38 and leading to a hand wheel (not shown). In this case braking by means of one of the brakes may be sufficient, but it will be understood that hand operation may be applied to additional brakes, if desired.

Figure 6:
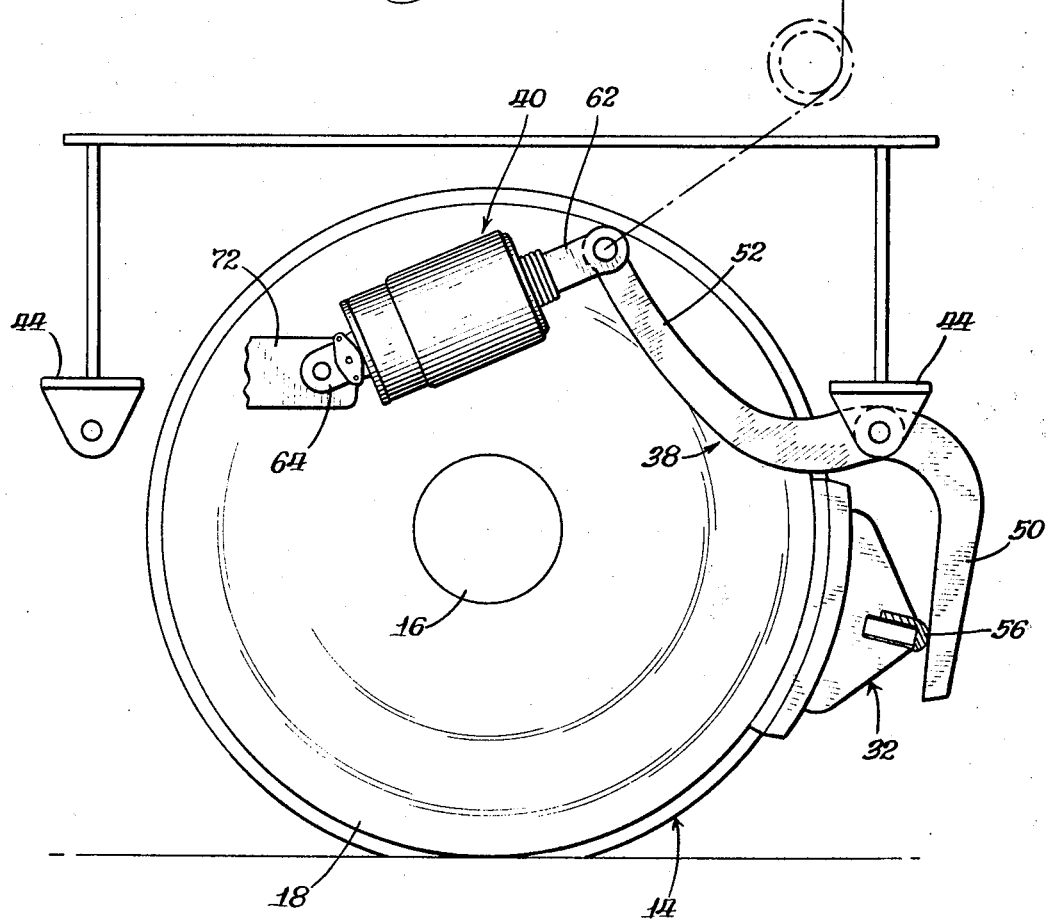
FIGURE 6 is a view oriented according to FIGURE 2, of a modified form, showing a single brake arrangement.

Reference is now made to FIGURE 6 showing the brake apparatus applied to a single brake. In the present instance a car construction of the kind illustrated in FIGURE 1 is again assumed, although in this case also the invention is applicable to other constructions of railway cars. In the present instance a single brake shoe 32 and power lever 38 is provided for each wheel. The power device 40 is pivotally connected at one end with the power lever 38, through the arm 62 and is rigidly secured at its opposite end through the arm 64 to a fixed element 72 of the body so that the power device and power lever 38 move vertically with the body. As illustrated, a hand brake may be applied in a similar manner to the one previously disclosed.

Another advantage of the invention is that a car can be converted from a single brake to a double brake arrangement, and vice-versa, in a very simple manner. Comparison of FIGURES 3 and 6 will indicate this complete convertibility and adaptability. For example, assuming a first condition of FIGURE 6 in which a single brake is utilized, a second brake can be applied and the power device 40 of FIGURE 6 removed from its mounting 72, and connected with the power lever 38 of the additional brake through the arm 64 in a simple manner. On the other hand, if it should be desired to convert the car from a double brake to a single brake arrangement, the power device 40 (of FIGURE 3) could be disconnected from the left hand power lever 38 and connected with the fixed element 72 of the body as shown in FIGURE 6.

While we have herein disclosed certain preferred embodiments of the invention, it will be understood that changes may be made therein within the spirit and scope of the appended claims.

We claim:

1. In a variable load brake means for a railway car having a body yieldably supported on wheels whereby the body assumes a vertical position relative to the wheels according to the size of the load on the body, and brake shoes in position to be applied to the wheels, power levers pivoted intermediate their ends in brackets suspended from and extending downwardly from the car body, each power lever having a downwardly extending arm effectively engageable with a brake shoe at a point removed from the fulcrum inversely proportional to the load of the car, and an upper arm, rigidly connected to the downward arm, and power means connected with the upper arms of the levers to pivot the levers to apply the brake shoes to the wheels.

2. In a variable load brake means for a railway car having a body yieldably supported on wheel-and-axle assemblies whereby the body assumes a vertical position relative to the wheels according to the size of the load on the body, at least one brake shoe associated with each wheel, brake beams supporting the brake shoes and extending across the car, the brake shoes being positioned closely adjacent the ends of the brake beams, and the brake beams supported by the wheel-and-axle assemblies in a vertically fixed position relative thereto but movable horizontally for movement of the brake shoes into and out of braking engagement with the wheels, power levers pivoted intermediate their ends in brackets supported by the car body and thereby movable vertically with the car body, each power lever having a downwardly extending arm slideably engageable with a brake beam adjacent the end of the beam and an upper arm extending toward the axis of a wheel and to a position thereabove, and power devices adjacent the vertical plane containing the axis of a wheel and positioned above that axis, said devices being carried by the car body and thereby movable vertically with the car body relative to the wheels, each power device having at least one connection with an upper arm of a power lever and being arranged so that upon energization thereof the device swings the lever to move a brake beam toward a wheel and axle assembly to frictionally engage a brake shoe against a wheel tread surface.

3. In a tread brake rigging for a railroad car having a body resiliently supported on wheels for vertical movement, brake shoes supported for movement toward and away from the wheels to frictionally engage the tread surfaces of the wheels, power levers pivotally suspended intermediate their ends from the body, each lever having a surface on one end in slideable abutting engagement with a brake shoe, and power means connected to the other end of the power levers to pivot said levers to move said brake shoes toward the tread surfaces of the wheels.

4. In a tread brake rigging for railway cars having side frames supported on wheel and axle assemblies and bodies resiliently supported for vertical movement on the side frames, brake beams supported upon the side frames for movement toward and away from the wheel and axle assemblies, brake shoes on said beams to frictionally engage the tread surfaces of the wheels, power levers pivotally suspended intermediate their ends from the bodies, each lever having a surface on one end in slideable abutting engagement with a brake beam, and power means connected to the other end of the power levers to pivot said levers to move said brake beams toward the wheel and axle assemblies to frictionally engage the brake shoes against the wheel tread surfaces.

5. In a tread brake rigging for a railway car having side frames supported on wheel and axle assemblies and a car body resiliently supported on the side frames for vertical movement relative to the side frames, two brake beams arranged on opposite sides of a wheel and axle assembly and supported at their ends upon the side frames for movement toward and away from the wheel and axle assembly, brake shoes on each brake beam to frictionally engage the tread surfaces of their respective wheels, two power levers pivotally suspended intermediate their ends on each side of the wheel and axle assembly, each lever having a surface on one end in slideable abutting engagement with their respective brake beams and power means secured to the other end of the power levers to pivot said levers to move said brake beams toward the wheel and axle assembly to frictionally engage the brake shoes against the wheel tread surfaces.

6. In a tread brake rigging for a railway car having side frames supported at their ends on wheel and axle assemblies and a car body resiliently supported on the side frames for vertical movement, a brake beam supported at its ends upon the side frames for movement toward and away from a wheel and axle assembly, two convex bosses on the brake beam adjacent the ends thereof, brake shoes on opposite ends of the brake beams to frictionally engage the tread surfaces of their respective wheels, two power levers pivotally suspended intermediate their ends from the car body, each lever having a surface on one end for slideable abutting engagement against their respective brake beam boss, and power means secured to the car body and pivotally connected to the other end of the power levers to pivot said levers to move said brake beams toward the wheel and axle assembly to frictionally engage the brake shoes against the wheel tread surfaces.

7. In a tread brake rigging for a railway car having side frames supported at their ends upon wheel and axle assemblies and a car body resiliently supported on the side frames for vertical movement, two brake beams arranged on opposite sides of a wheel and axle assembly and supported at their ends upon the side frames for movement toward and away from the wheel and axle assembly, two convex bosses on each brake beam adjacent the ends thereof, brake shoes on opposite ends of said beams to frictionally engage the tread surfaces of their respective wheels, two power levers pivotally suspended intermediate their ends from the body on each side of the wheel and axle assembly, each lever having a surface on one end for slideable abutting engagement against their respective brake beam boss, and power means interconnecting the other ends of the power levers to pivot said levers to move said brake beams toward the wheel and axle assembly to frictionally engage the brake shoes against their respective wheel tread surfaces.

References Cited

UNITED STATES PATENTS

| | | | |
|---|---|---|---|
| 3,207,271 | 9/1965 | Polanin et al. | 188—195 |
| 3,335,825 | 8/1967 | Mersereau et al. | 188—195 |

DUANE A. REGER, *Primary Examiner.*